H. H. McGEE.
SYRINGE VALVE.
APPLICATION FILED JUNE 3, 1920.
1,418,592.
Patented June 6, 1922.
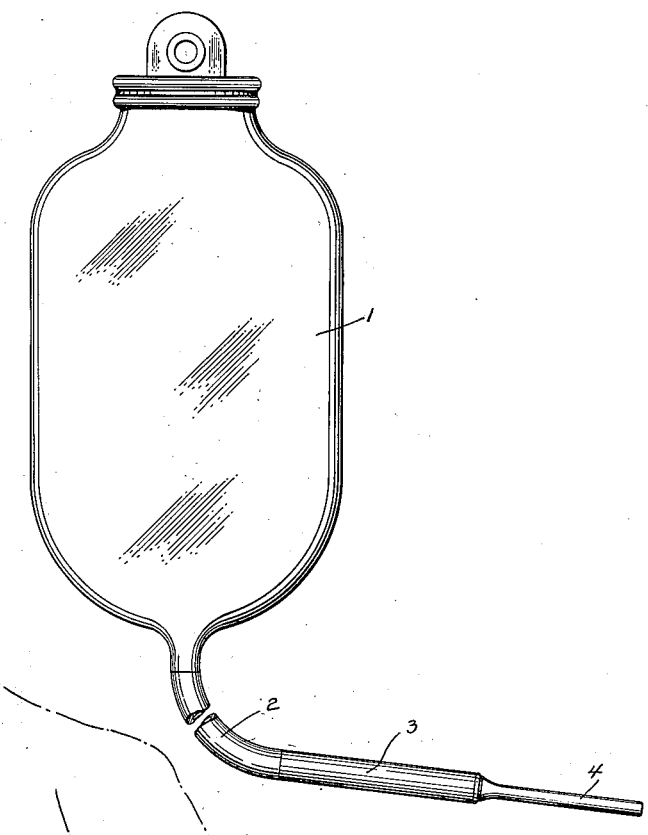
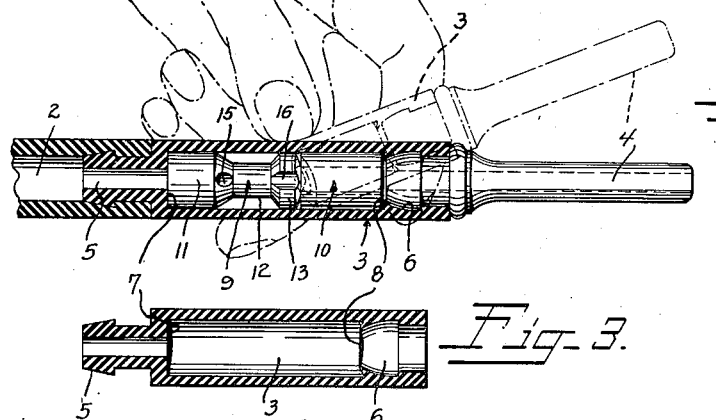
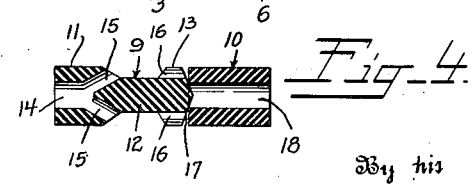
Inventor.
Howard H. McGee,
By his Attorney

UNITED STATES PATENT OFFICE.

HOWARD H. McGEE, OF WATERBURY, CONNECTICUT, ASSIGNOR TO THE GOODYEAR'S INDIA RUBBER GLOVE MANUFACTURING COMPANY, A CORPORATION OF CONNECTICUT.

SYRINGE VALVE.

1,418,592.   Specification of Letters Patent.   Patented June 6, 1922.

Application filed June 3, 1920. Serial No. 386,188.

*To all whom it may concern:*

Be it known that I, HOWARD H. McGEE, a citizen of the United States, residing at Waterbury, county of New Haven, and State of Connecticut, have invented certain new and useful Improvements in Syringe Valves, of which the following is a full, clear, and exact description.

This invention relates to a valve, which while capable of general use, is more particularly designed for fountain syringes and similar devices.

In the manufacture of fountain syringes it is impracticable to equip them with an ordinary form of valve, such as a turning plug or needle valve, owing to the expense, the weight, liability to leakage, etc. Moreover, if made of metal they would quickly become corroded and dangerous chemical actions caused by the fluids used, and the use of glass is out of the question by reason of its fragility and the extra expense for grinding the joints. Hence the common practice in the art has been to equip them with metal pinch cocks or shut-offs surrounding the outside of the nozzle supply tube, which shut-offs in one position allow free passage of the fluid through the tube and in another position pinch the walls of the tube together to shut off the supply. These shut-offs are at best a make shift and are open to numerous objections. They are sometimes lost when detached, their position on the tube is not fixed, if not accurately centered on the tube they fail to completely shut off, they are easily sprung out of shape and are sometimes hard to operate, particularly when used by a woman, and both hands are required to use the syringe, one to hold the nozzle and one to operate the shut-off. A still more serious defect is that the user after finishing frequently leaves the shut-off in closing or pinching position on the tube, and as the device may not be used again for some time this oversight results in a permanent distortion and weakening of the tube walls at the point where pinched, causing the tube to break or leak.

An object of my invention is to provide a manually operable valve or shut-off which is entirely enclosed in the conduit in which it is interposed and which has no exterior operating mechanism.

Another object is to provide a valve which may be actuated by merely flexing the conduit in which it is enclosed.

Still another object is to provide a valve which is non-corrodible, will not leak and is self closing.

A further object is to provide a control means for fountain syringes which is simple, efficient, not liable to get out of order, inexpensive to replace if broken, and cannot become misplaced or lost.

A still further object is to provide a combined fountain syringe nozzle and control means operable by one hand.

For a full and complete disclosure of my invention reference is had to the accompanying specification and drawings, in which latter Fig. 1 is a view of a fountain syringe equipped with my improved control means;

Fig. 2 is a side view, partly in section, of the valve and discharge pipe or nozzle, and illustrating in dotted lines the manner in which the valve is opened.

Fig. 3 is a section through the portion of the supply conduit forming the valve casing; and Fig. 4 is a section through the valve and valve seat.

Referring to the drawings the numeral 1 designates the reservoir of a fountain syringe, 2 the soft rubber supply tube, 3 the soft rubber casing of my improved controlling valve, and 4 the discharge pipe or nozzle, the casing 3 forming in effect a continuation of the supply tube 2. The casing 3, which is preferably a molded plug of soft rubber, is formed at one end with a nipple 5 for connection with the supply tube, while at its other end it is provided with a socket 6 for reception of the nipple of nozzle 4. It will be noted that at the point where the bore of casing 3 is contracted in forming nipple 5 a shoulder 7 is produced, while at the opposite end of the casing a second slightly undercut shoulder 8 is formed adjacent the socket 6, and between said shoulders a valve member 9 and valve seat member 10 are disposed. The valve member 9, which is preferably of hard rubber but which may be made of any other suitable material, is provided with an enlarged rear end portion 11, a reduced intermediate portion 12, and a head 13. The enlarged portion 11, which is of a size to snugly fit the bore of casing 3, is provided with a central bore 14 adapted to register with the bore of nipple 5, said bore 14 having branches or forks 15 discharging into the space between the wall of casing 3 and the reduced portion 12 of the valve member and the valve head 13 is provided with a plurality of peripheral channels or grooves 16 also communicating with said space. The forward or operative face of the valve head is of a relatively obtuse conical shape as shown at 17. Coacting with the valve head is the valve seat member 10, which is preferably made of soft rubber and is in the form of a short tube or bushing of a diameter to snugly fit within the bore of casing 3. It will be noted that the combined length of members 9 and 10, when juxtaposed as shown in Fig. 4, is somewhat greater than the distance between shoulders 7 and 8 of casing 3, as shown in Fig. 3, hence when the valve members are assembled in the casing as shown in Fig. 2 the casing is slightly stretched or put under tension, with the result that the conical surface 17 of the valve head tends to center itself in the bore 18 of the valve seat and the valve members are held firmly together in closed position. The valve members 9 and 10 may be readily inserted in the casing by forcing them through socket 6 and past shoulder 8, the undercutting of said shoulder aiding both in the insertion of the parts and also in their retention in yielding engagement.

In operation the user grasps the casing 3 between the thumb and fingers opposite the point of engagement of the members 9 and 10, and by bending the casing at this point the members are rocked upon each other, one side of the conical surface 17 approaching the flat end wall of valve seat 10, while the opposite side of surface 17 recedes from said wall and opens up a passage for the fluid between channels 16 and bore 18 of the valve seat. During such bending the opposite side walls of casing 3 have been placed under unequal tension and due to their elasticity they tend to instantly assume a straight position again and close the valve upon release of the bending pressure. By varying the pressure and consequent degree of bending the flow may easily be regulated to the desired amount. In using a fountain syringe the user ordinarily grasps the rubber tube immediately adjacent the discharge pipe or nozzle and bends the tube at this point as the nozzle is inserted in the body cavity to be treated, and by locating my improved control means at this point in the tube the valve is opened almost without conscious effort on the part of the user by a perfectly natural movement. In addition, by locating the control means at this point and operating it in the manner described the user can simultaneously direct and control the flow with one hand, which of course is impossible when using the old form of shut off. Moreover, with the use of my control means there is a practically instantaneous shut off of the flow of fluid, while with the old form there is more or less drip, dependent upon the distance the shut off is located from the nozzle.

The valve, while particularly adapted for use in a fountain syringe and in the specific location described, is capable of general use, an example of which is in chemical laboratories, where the use of the objectionable pinch cock is common for controlling the flow of corrosive or other fluids through elastic tubes.

While in the specific embodiment disclosed the valve casing is shown as normally straight and the valve operable by bending the casing to an angular position, it is obvious that it may be constructed in the reverse manner, and the present disclosure will suggest many other variations to those skilled in the art, without departing from the scope of the appended claims.

Having thus described my invention what I claim and desire to protect by Letters Patent is:

1. In combination, a tensioned flexible and elastic conduit, and means disposed within the conduit and held in operative relation by the tension thereof and operable by flexing the conduit for controlling the passage of fluid therethrough.

2. In combination, a tensioned flexible and elastic conduit, and means enclosed therein for controlling the flow of fluid therethrough and actuated by a change in the tension of adjoining portions of the conduit.

3. In combination, a flexible conduit, and a removable valve and valve seat resiliently and positively held together therein in one position and movable to another position by flexure of the conduit.

4. In combination, a tensioned elastic conduit, valve mechanism operatively held therein by the tension thereof and movable to open or closed position, said valve mechanism being movable to one of said positions by the elasticity of the conduit and to the other position by flexure of the conduit.

5. In combination, a valve and a valve seat having a rocking engagement to control the passage of fluid therethrough, and tensioned elastic means enclosing and normally holding said parts in one of their controlling positions, whereby upon rocking them the parts are moved to another controlling position.

6. In combination, a valve seat, a valve, and a tensioned elastic tube enclosing and normally holding said parts in valve closing contact, whereby they may be moved to open the valve by flexing the tube at their point of contact.

7. In combination, an elastic conduit having internal shoulders, a valve and valve seat disposed therein between said shoulders and normally held in closed position by the elasticity of the conduit, said valve and valve seat being moved to open position by bending the conduit at their point of engagement.

8. In combination, a flexible conduit having spaced shoulders in its bore, and a valve and valve seat disposed in alignment between said shoulders, said valve and seat having a combined length slightly greater than the distance between said shoulders, whereby they may be normally held in engagement by the elasticity of the conduit.

9. In combination, a valve seat and a valve adapted to engage the same in rocking engagement, a tensioned elastic conduit enclosing said parts and normally holding them in alignment and in closed position, whereby upon bending the conduit at their point of engagement they may be rocked to open position against the elasticity of the conduit.

10. In combination, a valve seat having a central bore, a valve provided with a head having a relatively obtuse seat-engaging surface adapted in one position to close said bore, and elastic means completely surrounding said parts and normally yieldably holding them in valve closing position.

11. In combination, an apertured valve seat, a valve having a rocking engagement with said seat to close said aperture, and a tensioned elastic valve casing surrounding said parts and holding them in engagement, whereby the valve may be rocked on its seat to open upon flexure of the casing at the point of engagement.

Signed at Naugatuck, Conn., this 28th day of May, 1920.

HOWARD H. McGEE.